United States Patent [19]
Bolick et al.

[11] Patent Number: 5,312,499
[45] Date of Patent: May 17, 1994

[54] METHOD AND APPARATUS FOR MAKING A LOOSE TUBE FIBER OPTIC CABLE COMPONENT

[75] Inventors: Rodney D. Bolick, Taylorsville; Mark A. Sigmon, Newton, both of N.C.

[73] Assignee: Siecor Corporation, Hickory, N.C.

[21] Appl. No.: 963,173

[22] Filed: Oct. 19, 1992

[51] Int. Cl.⁵ ............................................. B29C 47/10
[52] U.S. Cl. ...................................... 156/48; 156/51; 156/244.12; 425/114
[58] Field of Search ...................... 156/48, 51, 244.12; 425/114; 385/109, 113

[56] References Cited

U.S. PATENT DOCUMENTS

| | | | |
|---|---|---|---|
| 4,372,792 | 2/1983 | Dey et al. | 156/48 |
| 4,474,638 | 10/1984 | Einsle | 425/114 |
| 4,810,429 | 3/1989 | Mayr | 425/114 |

FOREIGN PATENT DOCUMENTS 149306  11/1950  Australia .................. 156/48

*Primary Examiner*—Caleb Weston
*Attorney, Agent, or Firm*—Roy B. Moffitt

[57] ABSTRACT

Disclosed is an apparatus and method for making a loose tube buffered optical fiber, the apparatus comprising an extrusion crosshead having an inlet and exit port connecting a plastic flow passageway circumscribing another passageway in which there is disposed a grease injection unit having three concentrically disposed tubes, the first tube delimiting a path for optical fiber travel, the first and second tubes spaced apart from one another forming a travel path therebetween for jelly or grease-like hydrocarbon filling material and the third tube (circumscribing the first and second tube) forming a chamber at a terminal end portion, the chamber in communication with the travel paths of both the grease and optical fibers and in which the grease comes in contact with the optical fibers, the chamber being so disposed that the contact point of the grease and fibers is only after the grease and fibers have traveled a majority of the length of the grease injection unit.

6 Claims, 3 Drawing Sheets

METHOD AND APPARATUS FOR MAKING A LOOSE TUBE FIBER OPTIC CABLE COMPONENT

FIELD OF THE INVENTION

The invention deals with method and apparatus for making a loose tube buffered fiber optic cable component.

BACKGROUND OF THE INVENTION

Fiber optic cables usually come in either the loose tube or tight buffered variety and their chief component is made by horizontal or vertically disposed apparatus. This invention concerns a horizontally disposed improved apparatus and method of making a loose tube cable component, which comprises a grease or hydrocarbon jelly like substance coated optical fibers loosely disposed inside of a tube made from some kind of suitable polymer, such as polycarbonate. The grease or jelly coated fibers are so disposed so that they may move relative to one another and to the tube itself. To make a loose tube fiber optic cable component, the prior art teaches one to assemble one or more optical fibers or a bundle of optical fiber ribbons in an elongated stream, a petroleum grease or jelly is applied thereto and then a plastic tube is extruded over the previously coated fibers. Such components are assembled into a core over which a plastic jacket is formed to complete a cable assembly. See, for example, U.S. Pat. No. 4,828,352, the contents of which are herein incorporated by reference.

Horizontally disposed prior art loose tube component making apparatus employ a long needle that extends from a grease injection head (where optical fibers, or ribbons, are coated with a jelly like hydrocarbon and then introduced into the needle) and a polymer extrusion crosshead, which forms a plastic tube about the coated fibers as they exit the polymer crosshead. Such apparatus requires that the needle have a centering device to manually center the needle in the X-Y position. Satisfactory results can be achieved using this type of apparatus if the polymer crosshead has a plastic flow passageway that is less than six (6) inches. Unsatisfactory results have been observed with crossheads having a plastic flow passage in the neighborhood of 12 inches or more. The longer the crosshead the longer the needles must be to extend through it to a point (outside of the crosshead) where molten polymer is caused to also exit (through a die) to form a tubular like body circumscribing the grease coated optical fibers. Long needles tend to produce higher tensions on the grease coated optical fibers because of the increased drag inside the needle, i.e., the grease comes into and stays in contact with the fibers or ribbons a longer time giving rise to stress on the fibers or ribbons. The present invention has as its objectives three things: (1) decreased tension on the fiber, short needles can be used; (2) prior art X-Y positioning apparatus is eliminated, the disclosed apparatus is self centering; and, (3) elimination of a tendency to waste jelly or grease like hydrocarbon fill material experienced in prior art apparatus arising out of grease back flow and/or prewetting.

BRIEF SUMMARY OF THE INVENTION

The disclosed invention is a method and apparatus for making a loose tube fiber optic cable component, namely a polymer plastic tube in which there is a disposed one or more optical fibers coated with a suitable grease or petroleum jelly in such a manner that the fibers are moveable relative one to another and/or with the tube itself. The method includes the steps of (a) providing a plastic extrusion crosshead and a grease injection unit, such a combination having first, second, and third concentric passageways and a chamber in communication with said first and second passageways; (b) moving one or more optical fibers (either in ribbon form or otherwise) along the first passageway into and out of the chamber; (c) flowing a mass of jelly like hydrocarbon filling compound (sometimes herein referred to as grease) through the second passageway into the chamber and into contact with the optical fibers in order to coat them; and, (d) flowing a mass of polymer resin through the third passageway and a die to form a polymer tube around the coated optical fibers after they exit the chamber. The optical fibers come into contact with the jelly like hydrocarbon in the chamber at a point only after the grease (and optical fibers as well) have traversed a majority of the length of the grease injection unit, applying the grease to the fibers at the last practical moment.

Apparatus suitable for carrying out the invention includes two basic elements, a crosshead and a grease injection unit disposed in the crosshead. This combination has four passageways, two in the crosshead and two in the grease injection unit. The crosshead itself contains an entrance and exit port (a tube forming die). This passageway (a first passageway) (a) connects the entrance with the exit port and is the path over which molten plastic (polymer) is forced to flow in a conventional prior art manner; and, (b) circumscribes a second passageway. Disposed in the second passageway in the crosshead is the grease injection unit, which has a length such that it traverses a major portion of the distance between the entrance and exit ports of the crosshead. It can be constructed from first, second and third tubular members concentrically disposed, one to another. The first and second tubes are spaced apart from one another in such a manner that they form a travel path (fourth passageway) therebetween through which the grease like hydrocarbon is forced to flow in a manner well known to the prior art. The first tube (circumscribed by the second tube) itself delimits a third passageway through which yet to be grease coated optical fibers are traversed. The third and outer tube member circumscribes both the first and second tube and at a terminal end portion thereof forms a chamber in which there is a terminal portion of the first tube. The chamber itself is in communication with the third passageway thus allowing grease like resin to flow into the chamber and come into contact with the optical fibers as they pass through but only after the grease and fibers have traversed a majority of the length of the grease injection unit.

Still another tube is employed (in the fiber optic trade this tube is called a needle) and is usually attached to the third tube. Through this needle, grease coated fibers are passed and as they exit from the needle there is formed thereover a plastic tube by the exit port (die) of the crosshead. A terminal portion of the needle usually protrudes slightly beyond the crosshead. By making the crosshead second passageway circular in shape or any shape that can be securely fitting around the outside surface of the grease injection unit (preferably a circular outer surface) the grease injection unit is self centering and self aligned.

DETAILED DESCRIPTION OF THE INVENTION

Figure 1:
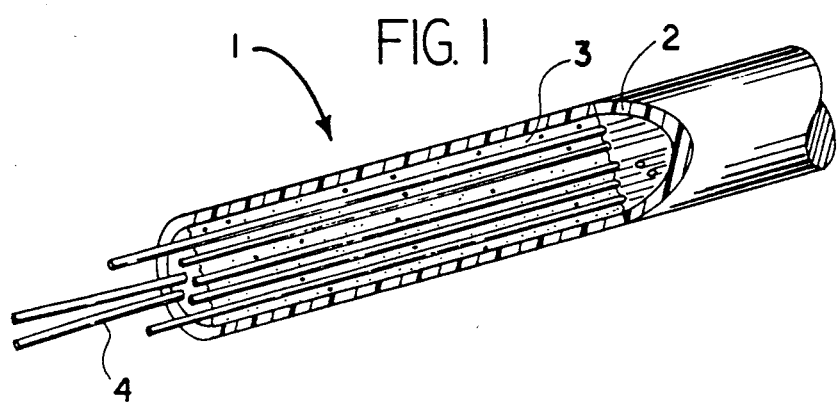
FIG. 1 is a cross sectional view of a loose tube fiber optic cable component.

Shown by element 1 of FIG. 1 is a loose tube component of a fiber optic cable. Plastic tube 2 is made from any suitable polymer, such as polycarbonate, formed about grease coated optical fibers 3–4. Optical fibers 4 can be either single fibers and/or optical fiber ribbons like that shown in U.S. Pat. No. 4,900,126, the contents of which are herein incorporated by reference. Plastic tube 2 can be either a single wall type or a multiwall type (not shown). For example it may be composed of two walls, both walls being formed from thermoplastic materials.

Figure 2:
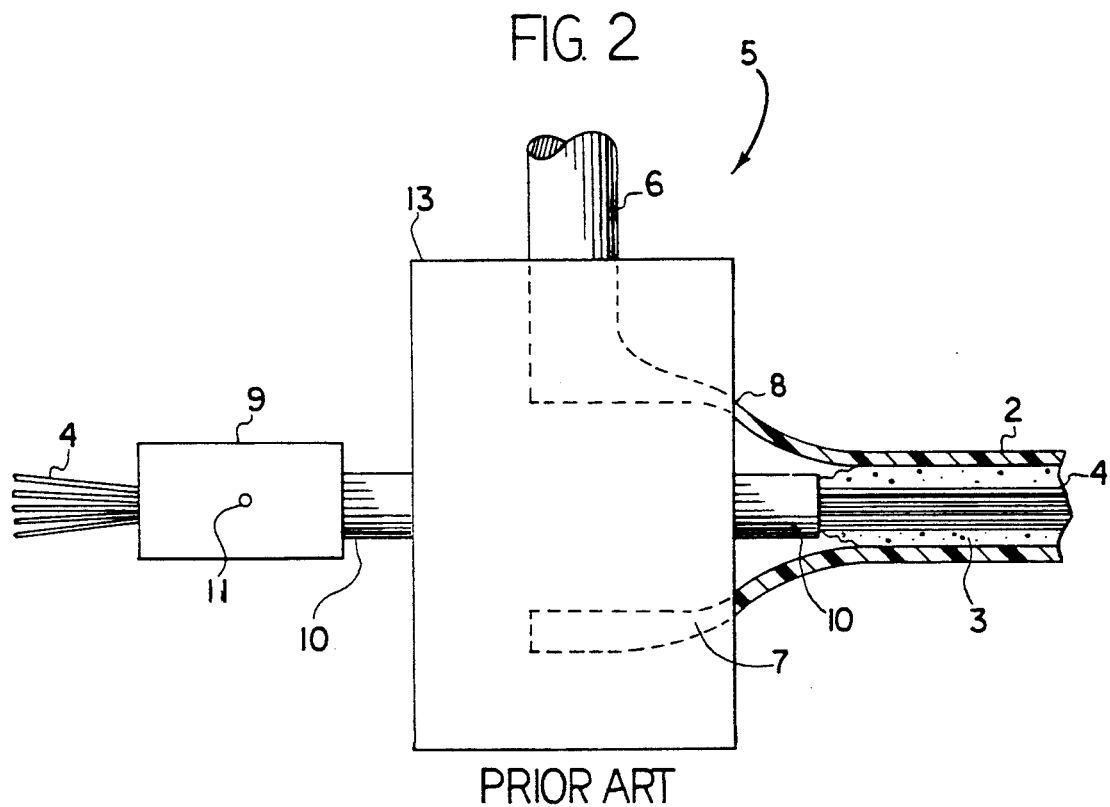
FIG. 2 is a schematic representation of prior art horizontal extrusion and grease injection apparatus used to manufacture the loose tube component of FIG. 1.

Loose tube element 1 is made using the prior art apparatus shown as element 5 in FIG. 2. Such apparatus includes a grease injection unit 9 and a plastic extrusion crosshead 13. Grease injection unit 9 also contains a small diameter tube (or a needle) 10 that extends all the way through crosshead 13 to the other side where, at its terminal free surface, a plastic tube 2 is formed over grease coated optical fibers 3–4. Crosshead 13 has inlet port 6 and exit port (die) 8. Between these two ports there is passageway 7 (flow channel) through which there is flowed a suitable polymer in a manner well known to the prior art, e.g, extrusion. It is of interest to note that at a point denoted by element 11 (inside of grease injection device 9) fibers 4 come into contact with the grease and stay in such contact all the way through the needle 10 until plastic tube is formed over the grease coated fibers 3–4.

Figure 3:
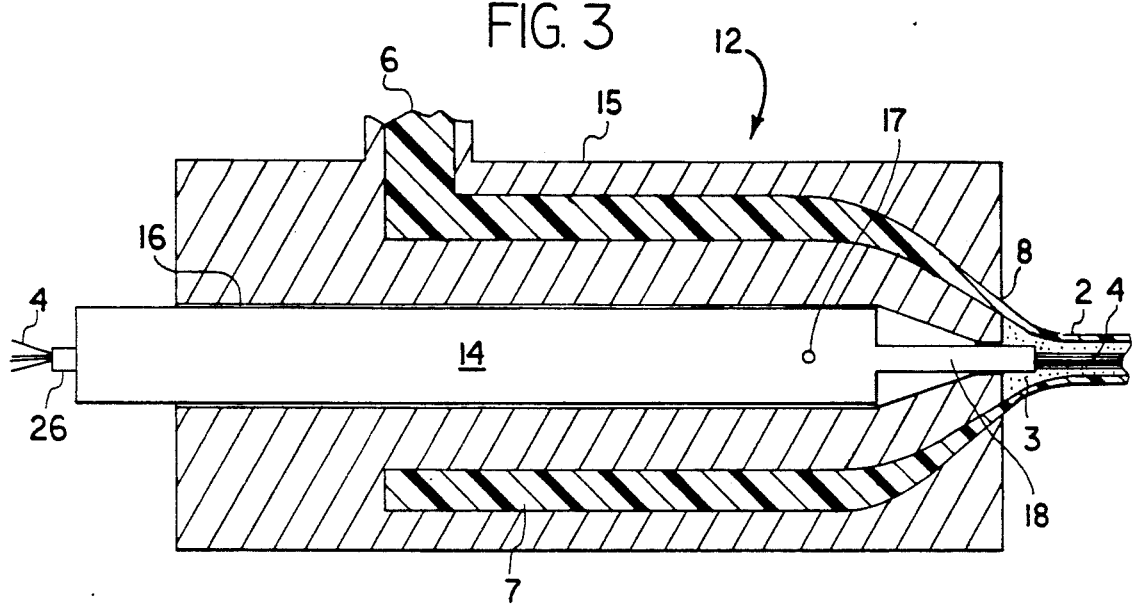
FIG. 3 is a schematic cross sectional view of the apparatus of the present invention.
Figure 5:
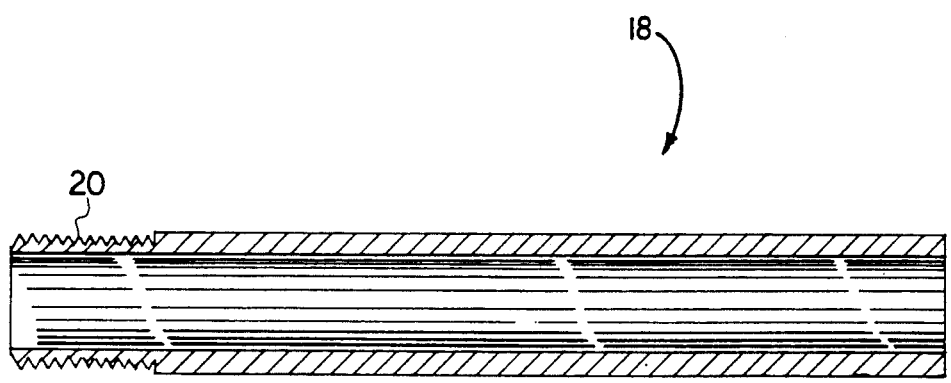
FIG. 5 is a cross sectional view of a needle used with the apparatus of FIG. 4.

In contrast to the prior art apparatus 5, the invention is shown as element 12 in FIG. 3. Comparing the structures of FIGS. 2 and 3, the contact point 17 of the invention, where optical fibers 4 first contact grease, is further to the right than contact point 11 of FIG. 2 and the needle of FIG. 3 is much shorter than the needle 10 of FIG. 2. As mentioned above, additional apparatus is needed to manually center the needle in the X-Y axis. Such is not needed within the invention of FIG. 3.

Element 15 is a crosshead, having a length longer than the length of crosshead 13 of FIG. 2. It has an inlet port 6 and a flow channel or passageway 7 and an exit port or die 8 much like that of FIG. 2. Crosshead 15 has another passageway shown by element 16, in which there is disposed grease injection unit 14, the details of which are more clearly shown in FIG. 4. As shown in FIG. 3, crosshead 15 has an exit die 8 at which point molten polymer exits the crosshead to form polymer tube 2. Optical fibers 4 are traversed through tube 26 (more fully explained below in the description of FIG. 4) and come in contact with grease at point 17 (specifically, just out by opening 29 of tube 26 inside of chamber 28) a point that represents a travel of the fibers 4 and grease over a majority of the length of grease injection unit 14. Contrary to what may seem logical, grease flowing into and along with a plurality of optical fibers creates a drag and stress on the fibers, which is undesirable. Thus, it has been found that it is beneficial to move the point of contact of grease and fibers from point 11 (FIG. 2) of the prior art to point 17 (FIG. 3) of the invention.

Flow passageway 7 connects inlet port 6 and exit port (die) 8 and is spaced apart from and circumscribes chamber 16, in which grease injection unit 14 is snugly fitted. Needle 18 is attached to the grease injection unit in a manner discussed below, and protrudes beyond the terminal free surface of crosshead 15, at which point a polymer tube is formed around grease coated fibers shown by elements 3 and 4.

Because the distance between point 11 (where the fibers in prior art apparatus first come in contact with the grease) is less than a like distance in element 12 of the invention, there is a tendency for grease to back up and spill out the upstream side of prior art element 9. The invention solves this problem by moving the point of grease/fiber (or grease/ribbon) contact 17 downstream from the entry port of needle 26 a distance greater than the majority of the length of element 14. In such apparatus, the grease does not have the tendency to put unwanted stress on fibers 4 and/or back up inside of the grease injection unit 14 causing grease to spill out to the left of entry needle 26.

Figure 4:
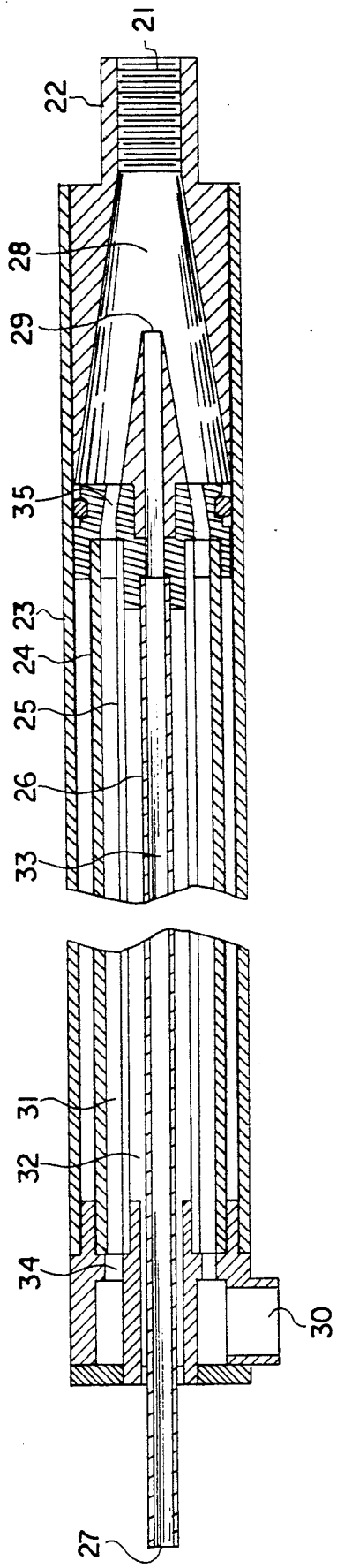
FIG. 4 is a cross sectional view of the grease injection unit of FIG. 3.

Reference is made to FIG. 4 describing the details of grease injection unit 14, which fits into passageway 16 of crosshead 15. Crosshead 15 has first and second passageways 7 and 16 respectively. Grease injection unit 14 is composed of a plurality of concentrically disposed tubes, the important ones being 23, 24, 25 and 26, delimiting third and fourth passageways, 33 and 31 respectively. Non grease coated optical fibers enter tube 26 at 27, are traversed through passageway 33 and exit into chamber 28 at point 29, a terminal tube end portion of tube 26. Chamber 28 is delimited by a terminal portion of outer tube member 23 and is so disposed, that the non grease coated fibers remain uncoated until they have traveled a majority of the length, of grease injection unit 14. A suitable hydrocarbon grease is pumped into entrance 30, through passageway 34 into a third passageway 31, delimited by circumferentially disposed tubes 24 and 25, through passageway 35 and thus into chamber 28, where it first comes in contact with fibers 4 and it is here fibers 4 are grease coated. See elements 3–4. Grease coated fibers 3–4 pass through end member 22 then through needle 18, which is attached to member 22 by means of threaded portions 20 and 21 of elements 22 and 18 respectively. Thereafter, plastic tube 2 is formed over greased coated fibers 3 and 4 as shown by element 2 of FIG. 3.

The invention applies a grease coating to a bundle of optical fibers or ribbons at the last practical moment, just before a plastic polymer tube is formed thereover. By so doing the three stated objectives of fiber stress relief, elimination of X-Y positioning apparatus and grease wastage are achieved.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. A device for making a loose tube fiber optic cable component including one or more grease coated optical fibers loosely disposed in a tubular member comprising:
   (a) a cross head having an entrance and exit port for extruding a tubular shaped plastic member, said crosshead having a polymer passageway connecting the entrance and exit ports through which molten plastic polymer may be flowed and a grease injection unit receiving passageway; and,
   (b) a grease injection unit disposed in said grease injection unit receiving passageway, said grease injection unit including fiber and grease passageways, both having terminal free ends, said fiber passageway delimiting a travel path for one or more grease uncoated optical fibers and said grease passageway delimiting a travel path for said grease and a chamber communicating with, said terminal free ends said terminal free end of said fiber passageway protruding into said chamber and beyond the terminal free edge of said grease passageway.

2. The device of claim 1 wherein said chamber communicates with another passageway through which grease coated optical fibers may be traversed.

3. The device of claim 1 wherein said grease injection unit is composed of three concentrically disposed tubes, one such tube forming the fiber passageway, two of such tubes being spaced apart forming the grease passageway and a terminal portion of another tube delimiting the chamber.

4. The device of claim 1 wherein said grease injection unit receiving passageway is circumscribed by said polymer passageway.

5. A method of forming a tubular shaped fiber optic cable component including a polymer shaped tube in which grease coated optical fibers are loosely disposed comprising:
   (a) providing a device having three passageways, one for traversing optical fibers, one for traversing a jelly like hydrocarbon and one for traversing molten polymer and a chamber in communication with terminating free ends of said first and second mentioned passageways;
   (b) traversing one or more optical fibers along said first mentioned passageway into and out of said chamber;
   (c) flowing a mass of jelly like hydrocarbon along said second mentioned passageway into said chamber and into contact with said one or more optical fibers to coat same; and,
   (d) flowing a mass of polymer resin through said third mentioned passageway and forming a polymer tube around said grease coated optical fibers after said grease coated optical fibers exit said chamber.

6. The method of claim 5 further providing a tube member attached to said chamber and passing said coated optical fibers through said tube member prior to forming thereover said polymer tube.

* * * * *